July 2, 1946.  D. M. LAWRENCE  2,403,381
REGULATED SYSTEM
Filed July 19, 1944
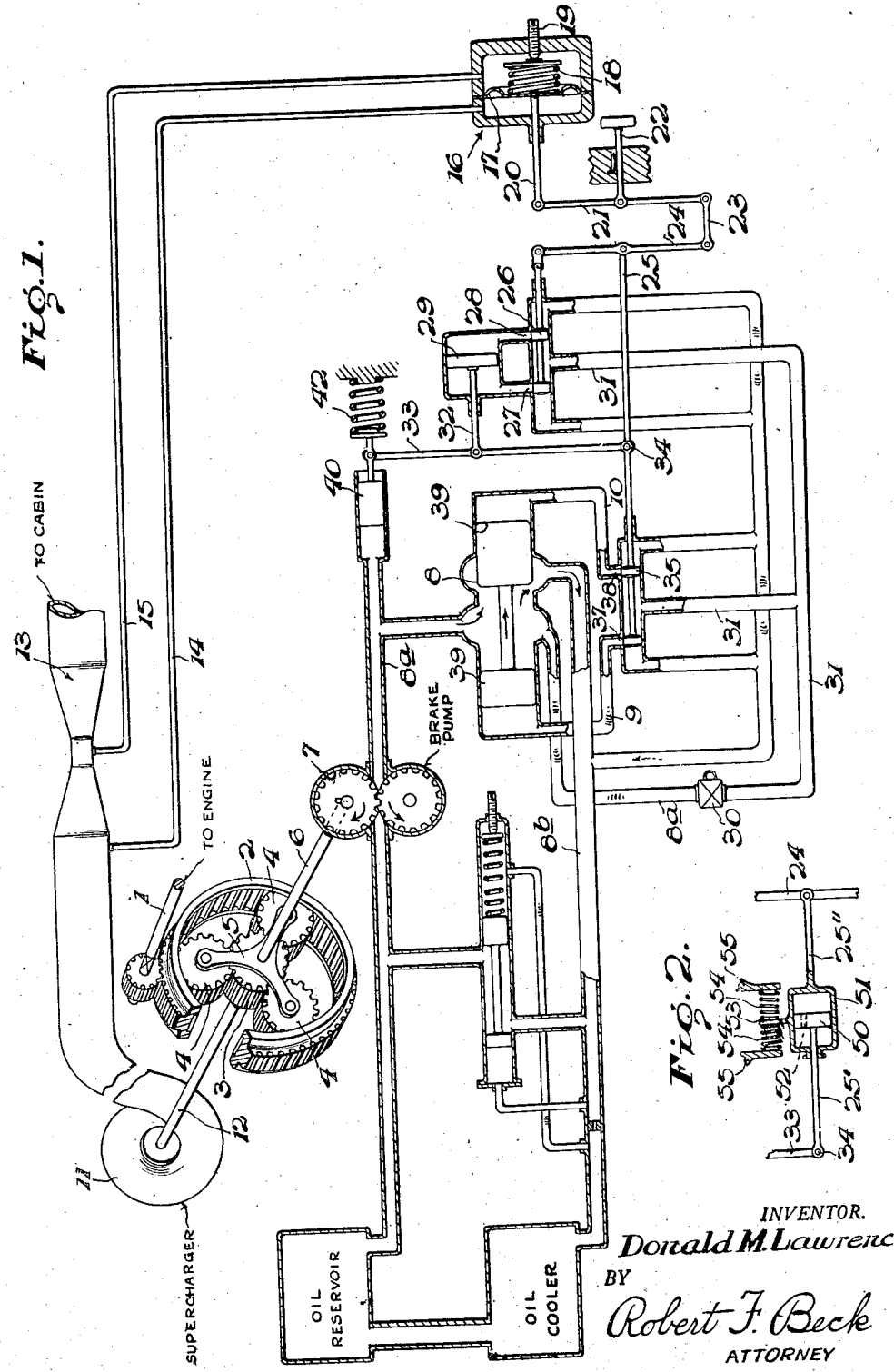
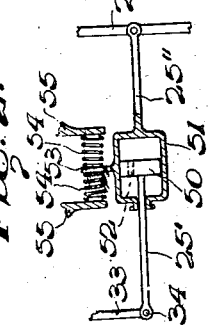
INVENTOR.
Donald M. Lawrence
BY
Robert F. Beck
ATTORNEY Patented July 2, 1946

2,403,381

UNITED STATES PATENT OFFICE 2,403,381

REGULATED SYSTEM

Donald M. Lawrence, Newark, N. J., assignor to Bendix Aviation Corporation, Teterboro, N. J., a corporation of Delaware Application July 19, 1944, Serial No. 545,688

8 Claims. (Cl. 230—11)

This invention relates to supercharger regulator systems and particularly to supercharger regulator systems for supplying air to aircraft cabins.

In the operation of aircraft, particularly at high altitudes, it is customary to provide the aircraft with a sealed cabin and to supply the cabin with air in such a manner that the pressure and rate of flow of the air to the cabin is controlled at all times.

One of the objects of the present invention is to provide a regulator system to maintain a predetermined rate of flow of air to the cabin at any altitude and at any engine speed between cruising and maximum R. P. M.

Another object of the present invention is to provide a regulator system so constructed and arranged as to automatically render the supercharger highly responsive to changing conditions while at the same time infallibly retaining full stability of control.

Another object of the invention is the provision in such a system, of a device of the foregoing described character which utilizes the balancing of opposing forces together with the use of linkage as follow-up means in lieu of follow-up hydraulic pressures.

An important object of the invention is to provide, as part of such a system, a regulator of the foregoing described character which is so constructed and arranged as to constantly maintain a desired rate of flow of air to the cabin through the medium of pressure-sensitive elements.

Another important object of the invention is to provide a regulator system of the foregoing described character which is equipped with means for preventing the maintenance of excessive rates of flow of air to the cabin.

A still further object of the invention is to provide, in such a system, a regulator of the foregoing described character which is simple in construction, durable in use, efficient in operation, economical in manufacture, relatively light in weight and extremely compact as to size.

Other objects and advantages will be apparent from a perusal of the specification, a study of the claims and an inspection of the annexed drawing.

Referring to the drawing, wherein like reference characters designate like parts throughout the several views:

Figure 1 is a diagrammatic view illustrating the invention in conjunction with a supercharger system for controlling the flow of air to an aircraft cabin.

Figure 2 is a detail view of a modified form of link.

As illustrated in Figure 1 of the drawing, I provide a driving system wherein an engine shaft 1 drives the external ring gear 2 of a planetary drive having a sun gear 3 driven by planet gears 4 pivoted on a spider 5. A shaft 6 connects the spider 5 with a gear in a gear pump brake 7 which, when its flow is throttled, imposes a driving torque which is proportional to the differential pressure across the pump. The driving system, including the hydraulic circuit shown, is disclosed and claimed in U. S. application for Letters Patent, Serial Number 421,082, filed November 29, 1941, and which system contains a throttling piston valve 8 to whose cylinder ends are connected pressure lines 9 and 10 which, when blocked, hydraulically lock the piston valve 8 in a throttling position securely even though valve 8 sets up a pressure drop of over 1000 p. s. i. between high and low pressure sides 8a and 8b, respectively. An increase in the air flow and hence of the Venturi pressure differential beyond a set value requires that main valve 8 move in the direction of the arrow in Figure 1, to decrease the driving torque on the blower.

As also disclosed in the aforementioned application, a supercharger or blower 11 is driven by the sun gear 3 through the medium of a shaft 12. Air drawn from the atmosphere by the blower 11 is discharged through the venturi 13. The venturi's inlet and throat pressure lines 14 and 15, respectively, carry the pressure differential to the casing 16 of the regulator where it acts upon a diaphragm 17 with a force which is opposed by a spring 18.

There is provided an adjusting screw 19 which is initially set to provide the selected or normal regulating value of the Venturi differential. A rod 20 is attached to the diaphragm 17 for movement therewith and has pivotally connected thereto one end of lever 21 which has its center fulcrumed on a longitudinally movable hand control member 22, the latter being moved by the operator to alter the value of the Venturi differential as required.

A link 23 pivotally connects the other end of the lever 21 with one end of a lever 24 which is fulcrumed on the end of a link 25. The other end of the lever 24 is pivotally attached to a first pilot or relay valve 26. The valve 26 operates to substantially close both of its ports 27 and 28 when in its neutral position. The ports 27 and 28 are pressure-connected with opposite sides of a floating reset piston 29. Oil for valve 26 is supplied from the hydraulic pressure line 8a through a pressure reducing valve 30 at 100 p. s. i. and a line 31. As is customary, the pressure is carried to the space between the lands of the valve 26 whose outer ends are connected to drain back into the suction line 8b for brake pump 7.

A rod 32, for piston 29, fulcrums lever 33 which has one end connected by a pivot 34 with link 25 to provide a kinetic follow-up for stabilizing the first relay valve 26.

A second relay valve 35 is also connected with pivot 34 to follow its movements. This valve has a central oil supply 31 and drains at the ends into the line 8b as with the first relay valve. When this valve 35 is in its neutral position, its lands cover the ports 37 and 38 for the servomotor pistons 39 of valve 8 to then lock this valve in a throttling position.

The back-pressure, due to valve 8, acts upon a piston 40 which is opposed by a spring 42. The piston 40 is pivotally connected to the end of the lever 33 which is opposite to the pivot 34 which it and the floating piston 29 position. Thus the pivot 34 is moved in accordance with both a follow-up from the hydraulic pressure in line 8a and with the resetting position of the floating piston 29.

The follow-up link 25 need not be solid and of constant length, as in Figure 1, but may be of a length varied as in Figure 2 in accordance with the rate of movement of the pivot 34. This is accomplished by making this link of two parts 25' and 25", one of which includes a piston 50 and the other a cylinder 51 of a dash pot which is preferably oil-filled. The piston 50 includes a throttling bypass hole 52 while the cylinder 51 has a stud 53 attached between centering springs 54 which also abut fixed supports 55. Since the follow-up action upon the lever 24 evidently increases with the rate of movement of the pivot 34, no further explanation is believed necessary.

In operation (referring to Figure 1), the blower 11 is driven by means of the differential-operated brake pump 7 which controls the driving torque. This brake pump 7 is controlled by the by-passing main control valve 8 which is operated by the pistons 39 of the servomotor which is governed by the second relay valve 35. When thus operated, air from the blower is propelled through the venturi 13 to produce a differential pressure which acts upon the spring-opposed diaphragm 17 to produce a corresponding diaphragm movement. The operating range of differentials is set, when the regulator is in service, by a friction-held selector 22 as shown, the lever 21 being operated in proportion to the venturi differential. The first effect is to operate the first relay valve 26 which controls the floating piston 29. The floating piston moves, through the medium of the rod 32 and the lever 33, the second relay valve 35 for the servomotor which operates the by-passing control valve 8 and also moves the first relay valve 26. To this end, the stabilizing follow-up link 25 connects the relay valve 35 with the lever 24.

To break up the proportionality following the stated sudden change of the pressure, the floating piston operates to produce a floating action which also affects the relay valve 35 which governs the brake pump. This initial action is followed by a substantial restoration, through the movement of rod 32 transferred from the floating piston 29, to break up any correspondence between the Venturi differential and the pressure of the hydraulic fluid in the line 8a so that control to a point is achieved. In spite of this accuracy of control, this arrangement insures the stability of the regulated system in practical operation.

When normally regulating precisely at the set venturi differential, the main valve 8 is locked in the throttling position suitable for the engine speed, atmospheric condition and tightness of aircraft cabin. For this locking, the relay valve 35 is neutralized relative to the ports 37 and 38. The relay valve 26 is also steadily in its normal position closing the ports 27 and 28 and the normal Venturi differential, acting on the diaphragm 17, compresses spring 18 just enough to keep the relay valve 26 in its neutral position.

Upon an increase of the flow due to, e. g., a sudden increase in cabin leakage-area, the increased Venturi differential forces to the right both the diaphragm 17 and pilot valve 26 to partially uncover both the port 28 to the supply pressure and the port 27 to drain. The piston 29 and its rod 32 float slowly to the left thus moving the pivot 34 of lever 33 also slowly to the left. Through the follow-up action of the link 25, the upper end of the lever 24 and the pilot valve 26 are also moved slowly to the left to asymptotically return the relay valve 26 to its neutral position. This movement of the pivot 34 to the left displaces the relay valve 35 to the left from its neutral position thus partially uncovering both port 37 to pressure and port 38 to drain. This operation moves valve 8 slowly to the right thus further opening the valve and lowering the hydraulic pressure in the line 8a. Under this reduced pressure, the piston 40 is forced slightly to the left by the spring 42 thus moving the upper end of the lever 33 to the left and the lower end, including the pivot 34, to the right until relay valve 35 is asymptotically restored to its neutral position to maintain the necessary change in the pressure on the brake pump 7.

In the meantime, the reduction of the back-pressure on the brake pump 7 has caused the speed of the blower 11 to decrease to diminish the flow of air through the venturi 13 and hence to asymptotically reduce the stated excess of the Venturi differential so that the diaphragm 17 completes the neutralizing of the relay valve 26. While these several actions have been described as occurring in sequence, actually they occur simultaneously, but with the major portion of each of the several actions occurring in the order described.

From the foregoing, it will be clear that a decrease of the Venturi differential will cause regulator changes in the opposite direction: relay valve 26 is moved to the left, so that piston 29 and relay valve 35 are moved to the right. The control valve 8 is thus moved to the left to increase the throttling to raise both the blower speed and the air flow to asymptotically restore the Venturi differential precisely to its normal set value.

The modified or alternate form disclosed in Figure 2 has the advantage of providing a more pronounced follow-up action upon a higher rate of change of the flow through the venturi. The thus-provided "rate" effect has not been found to be necessary in most cases, in which this link is satisfactorily a solid one which is simpler and lighter.

Of course, this regulator operates accurately, although somewhat less stably, with this link 25 omitted entirely, in which case the movement of the spring-opposed diaphragm 17 is carried directly to the relay 26 for the floating means.

Alternatively, this same regulator may be used with the following slight modifications to control an engine manifold pressure where a turbo-supercharger is used. In this case (1) the manifold pressure is carried to an aneroid pressure-type sensitive diaphragm which corresponds with the spring-opposed diaphragm 17 which is sensitive to the Venturi differential, and (2) the exhaust pressure is similarly carried to a larger pressure-sensitive element which corresponds with the hydraulic pressure-sensitive piston 40. Instead of operating a main control for a by-pass for a brake pump, there is operated a waste gate for the exhaust gas to the turbo-supercharger.

While only one embodiment of the present invention has been shown in the drawing, it is to be understood that various changes may be made in the construction thereof without departing from the scope of the invention and for this reason, it is intended not to limit the invention by the description herein given as an example, but solely by the scope of the appended claims, noting that the stated pressure or pressure differential is meant to include the differential pressure produced by the venturi and that the pump-braked drive may be replaced by any other suitable hydraulic motor.

What is claimed is:

1. A regulated system comprising, in combination, a blower, a venturi for the flow from the blower, a hydraulic device for governing the driving torque for the blower, and a regulator for the hydraulic device, which regulator includes means for maintaining a value of a physical variable proportional to the Venturi differential, means including a spring and piston for creating a movement of the piston proportional to the hydraulic pressure, a control valve for the hydraulic pressure, a servomotor for positioning said valve, a throttling relay for said servomotor, and follow-up means operatively connecting the relay with both the other means to correspondingly operate the relay upon a change in either the value of said physical variable or the position of said piston, said follow-up means including a resilient reset means having a second relay actuated upon a change of either said value or said position and a second servomotor governed by said second relay to reset the follow-up means to gradually destroy the stated correspondence, whereby, upon a sudden change of the flow through the venturi, there is a sudden proportional change in the corresponding value of said physical variable and an actuation of the first-named relay and of the reset means to produce a quick substantially proportional change of the hydraulic pressure followed by a slow further change thereof in the same direction.

2. A regulated system comprising, in combination, a blower, a venturi for the flow from the blower, a hydraulic device for governing the driving torque for the blower, and a regulator for the hydraulic device, which regulator includes a diaphragm opposed by a spring to create a diaphragm movement proportional to the Venturi differential, a first relay valve, and means including a first lever operatively connected at spaced points thereon with the relay valve and with the diaphragm to initially displace said relay valve from a neutral position a distance proportional to the diaphragm movement upon a sudden change of the position of the latter; a second relay valve, a servomotor governed thereby, and a main valve operated by the servomotor to control the hydraulic pressure; a spring-opposed piston subject to the hydraulic pressure, means including a second lever operatively connected at spaced points with the second relay valve and with the spring-opposed piston; a reset means including a piston pressure-connected to said first relay valve to floatingly move the last-mentioned piston in accordance with the position of the first relay valve; a link pivotally connecting said second lever with the floating piston to position said second relay valve; and follow-up means including a link pivotally connecting said second relay valve with said first lever to gradually restore said first relay valve to neutral subsequent to the stated sudden change; whereby a sudden change in the flow through the venturi causes an initially corresponding change of the hydraulic pressure followed by a further gradual change in the same direction.

3. A regulated system comprising, in combination, a blower, a venturi for the flow from the blower, a hydraulic device for governing the driving torque for the blower, and a regulator for the hydraulic device, which regulator includes a diaphragm opposed by a spring to create a diaphragm movement proportional to the Venturi differential, a first relay and means including a first lever operatively connected at spaced points thereon with the diaphragm to initially displace said relay from a neutral position a distance proportional to the diaphragm movement upon a sudden change of the position of the latter; a second relay valve, a servomotor governed thereby, and a main valve operated by the servomotor to control the hydraulic pressure; a spring-opposed piston subject to the hydraulic pressure, means including a second lever operatively connected at spaced points with the second relay valve and the spring-opposed piston; a reset means including a piston pressure-connected to said first relay valve to floatingly move the last-mentioned piston in accordance with the position of the first relay valve; a link pivotally connecting said second lever with the floating piston to position said second relay valve; and follow-up means including a link pivotally connecting said second valve with said first lever to gradually restore said first relay valve to neutral subsequent to the stated sudden change, said link including a spring-and-dashpot means effective to only temporarily alter the length of the last-mentioned link following the stated change; whereby a sudden change in the flow through the venturi causes an initially corresponding change of the hydraulic pressure followed by a further change in the same direction.

4. A regulated system comprising, in combination, a blower, a venturi for the flow from the blower, a hydraulic device for governing the driving torque for the blower, and a regulator for the hydraulic device, which regulator includes a diaphragm opposed by a spring to create a diaphragm movement proportional to the Venturi differential, a first relay valve, and means including a first lever operatively connected at spaced points thereon with the relay valve and with the diaphragm to initially displace said relay valve from a neutral position a distance proportional to the diaphragm movement upon a sudden change of the position of the latter; a second relay valve, a servomotor governed thereby, and a main valve operated by the servomotor to control the hydraulic pressure; a spring-opposed piston subject to the hydraulic pressure, means including a second lever operatively connected at spaced points with the second relay valve and with the spring-opposed piston; a reset means including a piston pressure-connected to said first relay valve to floatingly move the last-mentioned piston in accordance with the position of the first relay valve; and a link pivotally connecting said second lever with the floating piston to position said second relay valve.

5. A regulated system comprising, in combination, a blower, a venturi for the flow from the blower, a hydraulic device for governing the driving torque for the blower, and a regulator for the hydraulic device, which regulator includes a first means having a part thereof moved through a distance proportional to the Venturi differential, a first relay valve, and a second means operated by said first means part including a part to displace the relay valve from a neutral position a distance proportional to the distance through which said first means part is moved upon a sudden departure from a predetermined value of the Venturi differential; a second relay valve, a servomotor governed thereby, and a main valve operated by the servomotor to control the hydraulic pressure and hence the driving torque of said hydraulic device; a third means having a part moved through a distance proportional to the hydraulic pressure, and a fourth means having a part operated by said third means part to move said second relay valve in a direction to cause a movement of the main control valve in a direction to reduce the stated departure of the Venturi differential from the stated predetermined value; a fifth means pressure-connected to the first relay valve including a part floatingly moved in accordance with the position of the first relay valve; a first link operatively connecting said fourth means part with said fifth means floatingly moved part to gradually modify the position of the second relay valve; and a sixth follow-up means including a second link operatively connecting the second relay valve with said second means part to gradually restore the first relay valve to neutral subsequent to the stated sudden change; whereby a sudden change in the flow through the venturi causes a prompt initially corresponding change of the hydraulic pressure followed by a further gradual change in the same direction.

6. A regulated system comprising, in combination, a blower, a venturi for the flow from the blower, a hydraulic device for governing the driving torque for the blower, and a regulator for the hydraulic device, which regulator includes a first means having a part thereof moved through a distance proportional to the Venturi differential, a first relay valve, and a second means operated by said first means part including a part to displace the relay valve from a neutral position a distance proportional to the distance through which said first means part is moved upon a sudden departure from a predetermined value of the Venturi differential; a second relay valve, a servomotor governed thereby, and a main valve operated by the servomotor to control the hydraulic pressure and hence the driving torque of said hydraulic device; a third means having a part moved through a distance proportional to the hydraulic pressure, and a fourth means having a part operated by said third means part to move said second relay valve in a direction to cause a movement of the main control valve in a direction to reduce the stated departure of the Venturi differential from the stated predetermined value; a fifth means pressure-connected to the first relay valve including a part floatingly moved in accordance with the position of the first relay valve; and a first link operatively connecting said fourth means part with said fifth means floatingly moved part to gradually modify the position of the second relay valve; whereby a sudden change in the flow through the venturi causes a prompt initially corresponding change of the hydraulic pressure followed by a further gradual change in the same direction.

7. A regulated system comprising, in combination, a blower, a venturi for the flow from the blower for producing a first pressure which depends upon said flow; a hydraulic device for governing the driving torque for the blower in accordance with a second pressure which is that of the hydraulic fluid, and a regulator which controls said second pressure and hence said hydraulic device, which regulator includes a movable means for maintaining a displacement of a part thereof proportional to the value of the first pressure, means including a piston and spring for creating a displacement of the piston proportional to the second pressure, a servomotor for positioning the control valve, a throttling relay for said servomotor, and a follow-up means operatively connecting the relay with both the other means to correspondingly operate the relay upon a change in either of said displacements, said follow-up means including a reset means to gradually destroy the stated correspondence, whereby, upon a sudden change of the value of the first pressure, there is a sudden proportional change in the corresponding value of the displacement of said movable means part and an actuation of the relay means and of the reset means to produce a quick substantially proportional change of the second pressure followed by a slow further change thereof in the same direction.

8. A regulated system comprising, in combination, a blower, a venturi for the flow from the blower for producing a first pressure which depends upon said flow, a hydraulic device for governing the driving torque for the blower in accordance with a second pressure which is that of the hydraulic fluid, and a regulator which controls said second pressure and hence said hydraulic device, which regulator includes a first means having a part displaced an amount proportional to the value of the first pressure, a second means having a part displaced an amount proportional to the value of the second pressure, a pilot positioned by said first means part, a servomotor governed by said pilot, and a first follow-up connecting said servomotor with said pilot to limit the movement of the servomotor; and a relay moved by the servomotor, another servomotor governed by said relay for floatingly operating the control valve to alter said second pressure, and a second follow-up for said second pressure operated by said second-means-part to tend to return the relay to its neutral position and thereby limit the movement of the control valve by the last-named servometer; the arrangement being such that, upon a change of the first pressure, said first-means-part immediately moves said pilot to cause its servomotor to move a corresponding amount determined by the first follow-up to return the pilot to neutral and to simultaneously move the relay with the pilot to cause the relay's servomotor to move the control valve in the direction to tend to offset the stated change of the first pressure and by an amount limited by the second follow-up when the second pressure returns the relay to its neutral and, simultaneously with said returning action, again moves the pilot in the original stated direction to tend to minimize over-controlling during the interval of retardation before the first means appreciably responds to the effect of the initial movement of the control valve.

DONALD M. LAWRENCE.